United States Patent
Tateno

(10) Patent No.: US 9,419,309 B2
(45) Date of Patent: Aug. 16, 2016

(54) APPARATUS FOR PREVENTING DETERIORATION OF STORAGE CAPACITY OF RECHARGEABLE BATTERY, REGENERATING THE SAME, AND MEASURING STORAGE QUANTITY

(75) Inventor: Hiroto Tateno, Kagoshima (JP)

(73) Assignee: JSV CO., LTD., Kagoshima-Shi (JP)

( * ) Notice: Subject to any disclaimer, the term of this patent is extended or adjusted under 35 U.S.C. 154(b) by 33 days.

(21) Appl. No.: 14/241,202

(22) PCT Filed: Feb. 16, 2012

(86) PCT No.: PCT/JP2012/053662
§ 371 (c)(1),
(2), (4) Date: May 15, 2014

(87) PCT Pub. No.: WO2013/118310
PCT Pub. Date: Aug. 15, 2013

(65) Prior Publication Data
US 2015/0107989 A1  Apr. 23, 2015

(30) Foreign Application Priority Data
Feb. 10, 2012 (JP) ................................. 2012-027477

(51) Int. Cl.
*H02J 7/00*  (2006.01)
*H01M 10/42* (2006.01)
(Continued)

(52) U.S. Cl.
CPC ........... *H01M 10/4242* (2013.01); *H02J 7/007* (2013.01); *H02J 7/0057* (2013.01); *H01M 10/44* (2013.01); *H01M 10/48* (2013.01); *H02J 2007/004* (2013.01)

(58) Field of Classification Search
CPC ... H02J 2007/004; H02J 7/0057; H02J 7/007; H01M 10/4242; H01M 10/44; H01M 10/48
USPC .......................... 320/131; 204/196.04, 196.07
See application file for complete search history.

(56) References Cited

U.S. PATENT DOCUMENTS 5,783,929 A  7/1998 Taricco
5,891,590 A  4/1999 King
(Continued)

FOREIGN PATENT DOCUMENTS

CN  1617381 A  5/2005
JP  S55-111079 A  8/1980
(Continued)

OTHER PUBLICATIONS

United States Patent and Trademark Office, "Non-Final Office Action", issued in U.S. Appl. No. 13/578,085, on Feb. 24, 2015, 6 pages.
(Continued)

*Primary Examiner* — Nathaniel Pelton

(57) ABSTRACT

Provided is an apparatus in which an electrode insulation inactivating layer on the basis of charge and discharge which is a cause for deterioration of storage capacity of a rechargeable battery is regenerated by thermo-mechanical effects caused by dielectric relaxation loss, individual frequencies of dielectric relaxation loss of rechargeable batteries in general are automatically searched by an increase in high-frequency dependent charging current, the insulation layer is selectively decomposed, termination of charge of the storage battery is additionally known by connecting or disconnecting a frequency of dielectric relaxation loss, and electric current conductance at a frequency of dielectric relaxation loss gives a storage quantity which is a state of charge.

3 Claims, 9 Drawing Sheets

(51) Int. Cl.
*H01M 10/44* (2006.01)
*H01M 10/48* (2006.01)

(56) References Cited

U.S. PATENT DOCUMENTS

| | | | |
|---|---|---|---|
| 6,730,428 B1 | 5/2004 | Kondo et al. | |
| 2006/0051659 A1 | 3/2006 | Kelly et al. | |
| 2006/0065547 A1 | 3/2006 | Okuno | |
| 2007/0132456 A1 | 6/2007 | Salman et al. | |
| 2010/0117604 A1 | 5/2010 | Zeier | |
| 2010/0164430 A1* | 7/2010 | Lu | H01M 10/441 320/103 |
| 2012/0326675 A1* | 12/2012 | Tateno | H01M 10/06 320/138 |

FOREIGN PATENT DOCUMENTS

| | | |
|---|---|---|
| JP | 2000040537 A | 2/2000 |
| JP | 2000156247 A | 6/2000 |
| JP | 2000323188 A | 11/2000 |
| JP | 2001-517419 | 10/2001 |
| JP | 2002334723 A | 11/2002 |
| JP | 2004079374 A | 3/2004 |
| JP | 2006244973 A | 9/2006 |
| JP | 3902212 B2 | 4/2007 |
| JP | 2009176705 A | 8/2009 |
| JP | 2009-284571 | 12/2009 |
| JP | 4565362 | 10/2010 |
| JP | 2011-171007 | 9/2011 |
| WO | WO2011102237 * | 8/2011 |

OTHER PUBLICATIONS

European Patent Office, "Supplementary European Search Report", issued in European Application No. 12 867 946.1, which is a European counterpart of U.S. Appl. No. 14/241,202, issued on Nov. 11, 2015, 2 pages.

* cited by examiner

F I G. 1
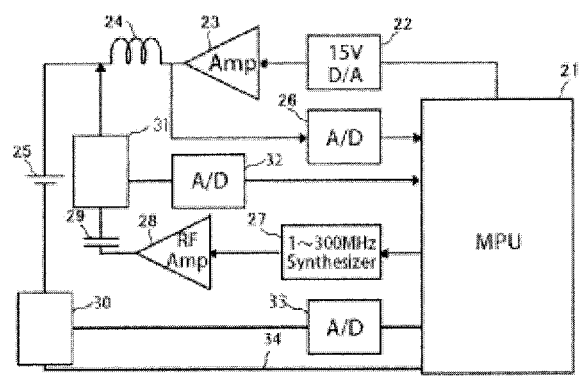

F I G. 3
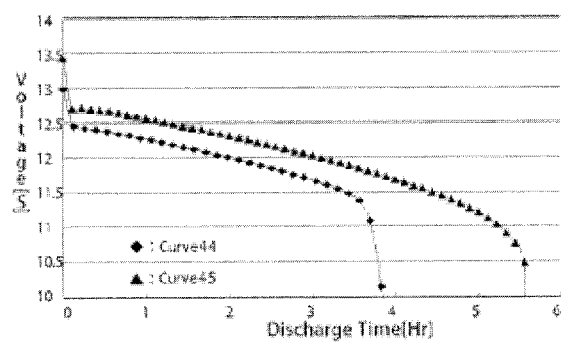

F I G. 4
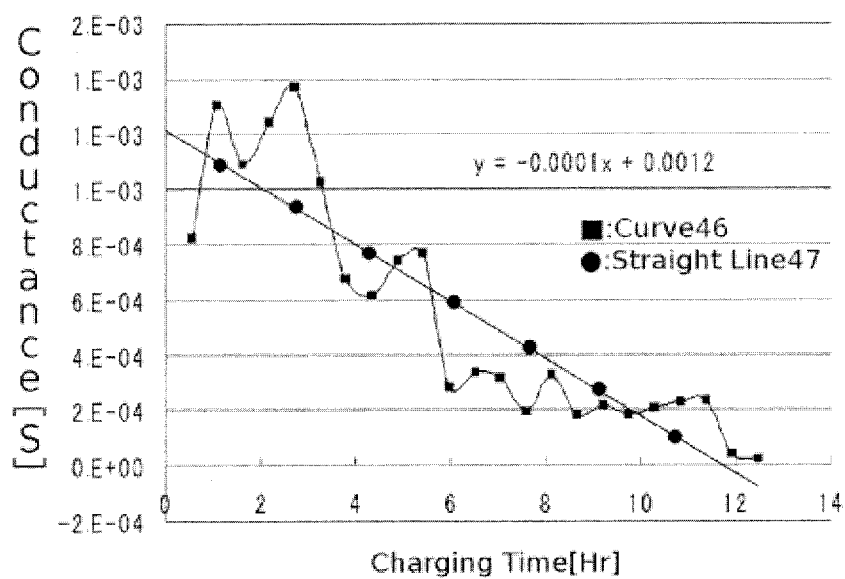

F I G. 5
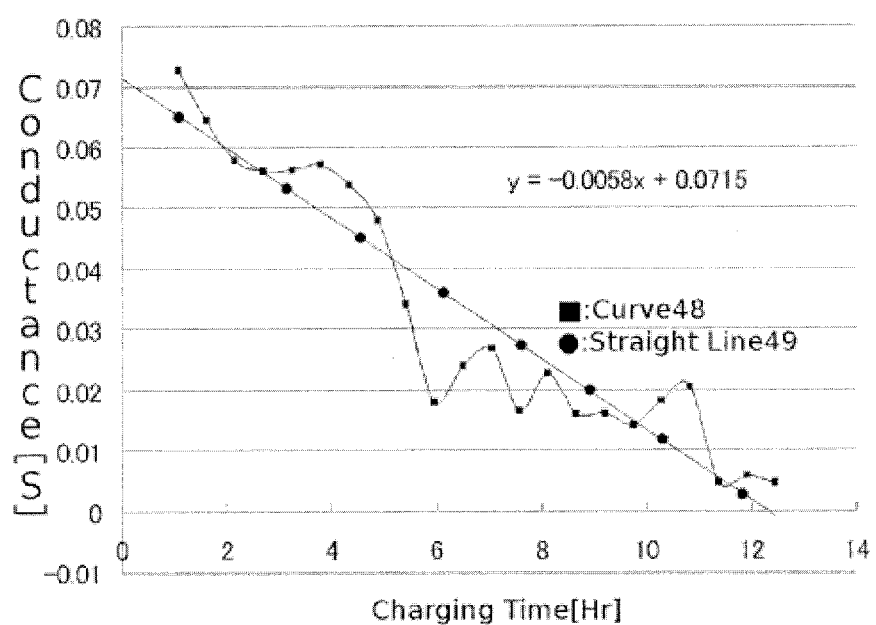

F I G.6
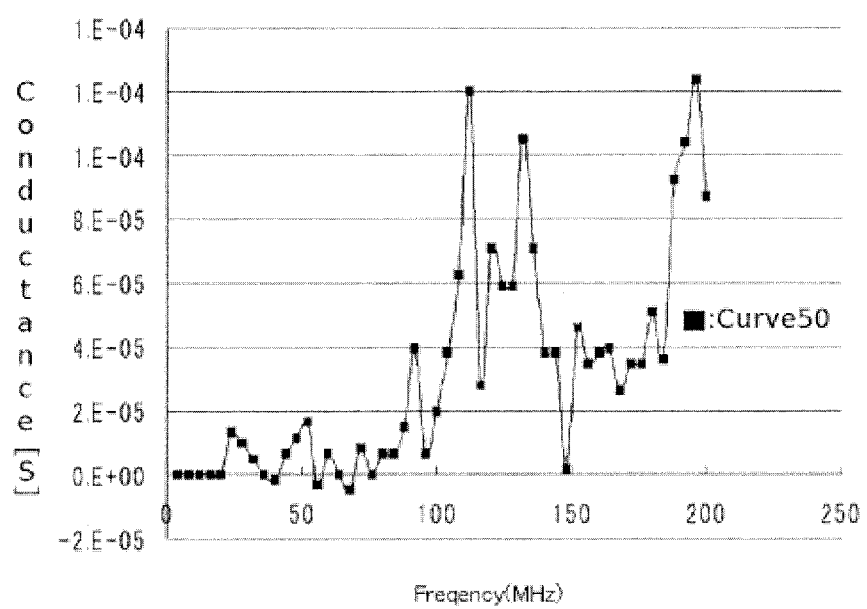

F I G.8
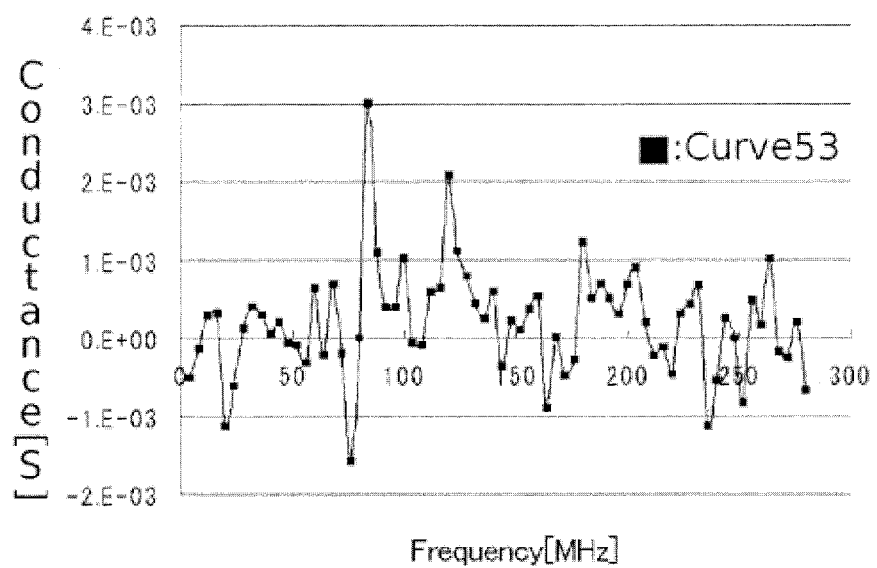

APPARATUS FOR PREVENTING DETERIORATION OF STORAGE CAPACITY OF RECHARGEABLE BATTERY, REGENERATING THE SAME, AND MEASURING STORAGE QUANTITY

BACKGROUND OF THE INVENTION

The present invention relates to an apparatus for preventing deterioration of a rechargeable battery and regenerating the battery, that is, the apparatus for regenerating the battery by dielectrically heating and pulverizing an electrode non-conductor inactivating substance generated on the basis of discharge at a frequency of dielectric loss of the inactivating substance to effect electrochemical decomposition by charging current. The present invention also relates to an apparatus in which a dielectric heating current value obtained at the same time gives a storage quantity, that is, a quantity of dielectric dipole which is a quantity of the electrode non-conductor inactivating substance proportional to a discharged quantity is proportional to conductance at a peak frequency of dielectric loss, thereby knowing the discharge quantity, and the discharge quantity at the present time is deducted from a rated storage quantity to know a storage quantity which is a state of charge (SOC).

In a rechargeable battery, an electrode surface of the battery is covered with a thin film of an inactivating substance which is a poor conductor due to an increase in the number of times the battery is discharged. The thin film crystallizes with the elapse of time and crystallization results in electrical insulation of a charging channel which undergoes electrochemical decomposition by charging current. Recharge will not enable the regeneration of positive electrodes and negative electrodes, thus resulting in deterioration of storage capacity of the battery. Nowadays, with what is called smart grids which stabilize and store unstable electric power generated by natural energies such as sunlight and wing power, it is indispensable to prolong the service life of a rechargeable battery which is lower in price. In addition, it is necessary to provide technologies for preventing deterioration of storage capacity due to cycles of charge and discharge and regenerating the battery. Measurement of a storage quantity which is information on SOC is necessary for utilization of stored electricity.

Nowadays, as technologies for preventing deterioration of storage capacity of a rechargeable storage battery and regenerating the battery, there is known an apparatus which was granted and disclosed in Japanese Patent No. 4565362 to the applicant of the present invention in which, with restrictions placed only on prevention of deterioration of a lead acid battery and regeneration of the battery, a high-frequency electric current is allowed to flow, thereby giving heating of dielectric loss to a layer of lead sulfate grown on an electrode surface to remove the insulation layer of lead sulfate. However, there have been so far filed no patents which cover technologies for preventing deterioration of rechargeable storage batteries in general and regenerating the batteries by automatically searching individual peak frequencies of dielectric relaxation loss or apparatuses for measuring remaining storage quantity.

The above document only deals with a lead acid battery, aiming at destruction of fine crystals of lead sulfate by using an apparatus for preventing deterioration of storage capacity of the battery and regenerating the battery or the apparatus for regenerating the battery by dielectrically heating and pulverizing electrode non-conductor inactivating lead sulfate crystals generated on the basis of discharge at a frequency of dielectric loss of the inactivating substance to effect electrochemical decomposition by charging current.

However, no measurement has been made for remaining storage quantity. There has been so far filed only a patent which is limited to a lead acid battery and deals with regeneration of the battery by dielectric heating decomposition and prevention of the deterioration thereof.

The present invention has been made in view of the above-described situation, an object of which is to provide an apparatus for measuring remaining storage quantity together with prevention of deterioration and regeneration of a rechargeable storage battery which can be applied to any type of the rechargeable storage battery. The present invention covers technologies for preventing deterioration of rechargeable storage batteries in general and regenerating the batteries by automatically searching individual peak frequencies of dielectric relaxation loss and an apparatus for measuring remaining storage quantity.

SUMMARY OF THE INVENTION

The cycle life of charge and discharge by a rechargeable battery is shortened by accumulation of an electro-chemical inactive insulator on electrodes. In general, an insulator undergoes dielectric relaxation loss and, for example, when a surface layer of lithium carbonate and that of alkyl lithium carbonate on a lithium ion battery are driven at a voltage of dielectric relaxation frequency, insulation crystals are thermo-mechanically distorted by dielectric loss heat, thereby forming fine cracks on the crystals to attain electric conduction, and electrochemical decomposition is caused by charging current, thus making it possible to regenerate and restore the storage capacity. An electrode surface which is not covered with an insulator is low in electric conductivity. This is because the electric conductivity on the surface of a metal electrode is mainly derived from ion diffusion current. And, since ion current is several hundred kHz or lower in response speed, the electric conductivity on the surface of a metal conductive electrode is small in a megahertz band of frequency of electricity storage inactivating dielectric relaxation. Therefore, at a high-frequency region, electric current will flow selectively in a concentrated manner on the surface of a high-frequency insulation layer high in dielectric rate.

A quantity of oxidized film insulator of an electrode by discharge is proportional to a quantity of discharge electricity according to Faraday's law of induction. In a dielectric heating current at a constant voltage which is driven cumulatively on charge, the number of chargeable dielectric dipoles which are not yet crystallized and the number of crystallized inactive dipoles are regarded as a quantity of high-frequency electric current to give conductance and also give a consumed storage quantity. That is, the number of dielectric dipoles which is a quantity of an electrode non-conductor substance proportional to a discharge quantity is proportional to conductance at peak frequencies of relaxation loss of both dielectric crystallization and non-crystallization dipoles, thereby knowing the discharged quantity, and the discharge quantity at the present time is deducted from a rated storage quantity to know a storage quantity. In a non-specific rechargeable battery, a peak frequency of dielectric relaxation loss is unknown. However, a high frequency at a constant voltage for driving dielectric relaxation loss is subjected to frequency sweeping during charge by direct current at a constant voltage or at a constant electric current, by which the most effective frequency at which an electro-chemical inactive insulator of the electrode undergoes decomposition of dielectric relaxation loss is known by referring to time when direct current on charge becomes maximum or a decrease in voltage on charge in the case of constant electric current. It is difficult to clearly know the time of complete charge when a substantial quantity of dark current flows during charge at a constant voltage even if a rechargeable battery is fully charged. Termination of complete charge is clearly indicated by the fact that charging current is not changed by connection or disconnection at a peak frequency for driving inactive dielectric relaxation loss. The state of charge, that is SOC, is able to accurately control invalid charging electricity charged by smart grids or others, clearly indicating a remaining storage quantity.

According to the present invention, an electro-chemical inactive insulation crystalline film of an electrode which prevents recharge of a rechargeable storage battery based on a non-specific principle is selected and subjected to thermo-mechanical fine decomposition. It is, therefore, possible to prevent semi-permanently deterioration of the rechargeable storage battery based on the none-specific principle by charge and discharge and also regenerate the battery. Specific information on termination of complete charge of a rechargeable battery is able to accurately control invalid charging electricity which is charged as dark current. Conductance at peak frequencies of relaxation loss of both dielectric crystallization and non-crystallization dipoles caused by discharge is strength of dielectric relaxation to provide information on a discharge quantity. The discharge quantity at the present time is deducted from a rated storage quantity to know an accurate quantity of remaining storage. Specific information on termination of complete charge and information on the accurate quantity of remaining storage are called a state of charge (SOC) and this is indispensable information on technologies of smart grids and others for utilizing rechargeable storage batteries.

BRIEF DESCRIPTION OF THE DRAWINGS

FIG. 1 is a block diagram which briefly shows an apparatus for preventing deterioration of a non-specific storage battery and regenerating the battery.

FIG. 3 is a drawing which shows comparison in which the lead silicate battery is regenerated at a five-hour discharge rate.

FIG. 4 is a drawing which shows conductance of direct-current charge at a high frequency by regenerating the lead silicate battery.

FIG. 5 is a drawing which shows conductance at a high frequency by regenerating the lead silicate at a high frequency.

FIG. 6 is a drawing which shows conductance at a high frequency when a lithium ion battery is used.

FIG. 8 is a drawing which shows conductance at a high frequency when a nickel hydrogen battery is used.

DETAILED DESCRIPTION OF THE PREFERRED EMBODIMENTS

Figure 2:
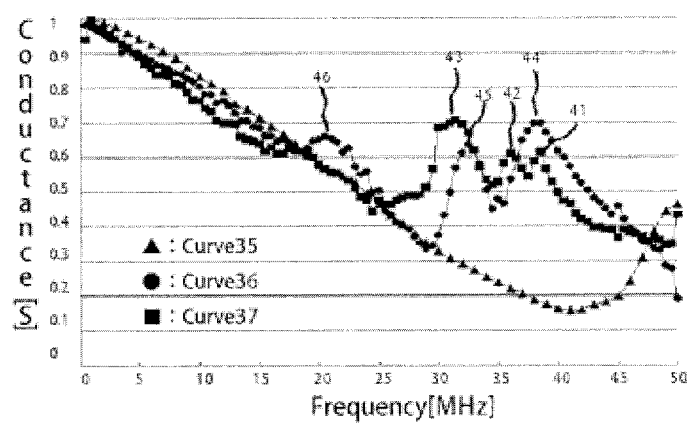
FIG. 2 is a drawing which shows characteristics of a leas silicate battery about a frequency of dielectric loss current.

Hereinafter, a description will be given of one example as an embodiment of the present invention by referring to FIG. 1 to FIG. 9.

Example 1

FIG. 1 is a block diagram which shows briefly an apparatus for preventing deterioration of a non-specific storage battery and regenerating the battery according to an embodiment of the present invention. This apparatus is provided with a microprocessor 21 (MPU) for controlling the apparatus for regenerating the storage battery, a charging voltage commanding D/A converter 22 by the MPU 21, a charging voltage power amplifier 23, a high-frequency cutoff coil 24, a storage battery 25, a storage battery terminal voltage measurement A/D converter 26, a dielectric loss frequency sweeping synthesizer 27, a dielectric loss frequency electric power amplifier 28, a direct current cutoff condenser 29, a charging current detector 30, a dielectric loss frequency electric current detector 31, a dielectric loss frequency electric current measurement A/D converter 32, a charging current measurement A/D converter 33, and a charging current returning channel 34.

A lead silicate battery (12 volts) mounted on an electrically driven motorcycle discarded due to deterioration was regenerated by using the apparatus for preventing deterioration of the battery and regenerating the battery, the results of which are shown in FIG. 2. In order to search a frequency of dielectric loss of lead silicate, a peak of dielectric conductance was searched.

A Curve 36 is a high-frequency dependent conductance curve for a lead silicate storage battery which is to be regenerated but not yet charged, and the curve has three peaks of dielectric loss 44, 45 and 46. A Curve 37 is a conductance frequency spectrum curve on ordinary charging by direct current, and the curve has peaks of dielectric loss 41, 32 and 43. A Curve 35 is a high-frequency dependent conductance curve for the lead silicate storage battery after being charged and regenerated which was obtained by automatically monitoring a frequency of dielectric loss. The peaks of dielectric loss 41, 42, 43, 44, 45 and 46 disappeared.

In a method for charging and regenerating a non-specific storage battery by automatically monitoring a frequency of dielectric loss, the A/D converter 26 is used to measure a voltage of the storage battery 25 and the voltage is input into the MPU 21. Upon detection of a release voltage of the storage battery 25 which is equal to or lower than a predetermined value, the MPU 21 goes into a mode of regenerating the storage battery and produces a high-frequency electric current from the dielectric loss frequency sweeping oscillator 27 to amplify the current by the high frequency electric power amplifier 28, thereby allowing a heating alternating current of dielectric loss to flow into the storage battery 25 via the direct current cutoff condenser 29. The MPU 21 amplifies the current by using the electric power amplifier 23 from the D/A converter 22 and starts to charge the storage battery via the high frequency cutoff coil 24, while monitoring a stipulated charging current by using the charging current detector 30. The MPU 21 sweeps a frequency of dielectric loss, and constantly measures a charging current of the storage battery 25 to search a peak point of increasing the charging current. And, termination of decomposition of a charging inactivating substance by dielectric heating is when the charging current is kept unchanged by switching on or off the dielectric loss frequency electric power amplifier 28. A determination on termination of complete charge of the battery for regeneration is made by subjecting all the frequency bands of dielectric loss to sweeping. Further, as apparent from FIG. 2, a determination on termination of complete change of the battery for regeneration can be made by sweeping all the frequency bands of dielectric loss to confirm that peaks of dielectric relaxation have disappeared by using the dielectric loss frequency electric current detector 31.

A Curve 44 in FIG. 3 shows a five-hour discharge rate by using only direct current as shown in the Curve 36 in FIG. 2.

Discharge is terminated in 3 hours and 50 minutes. The Greensaver SP27-12S is specified at 6.5 A/h for 32 A hr. A discharge Curve 45 after sufficient charge for regeneration by automatically monitoring a frequency of dielectric loss shows 5 hours 50 minutes, thus resulting in complete regeneration of the storage battery.

A Curve 46 in FIG. 4 is such that a lead silicate battery SP27-12S is repeatedly subjected to sweeping and loading at a high frequency from 1 MHz to 90 MHz during charge of 3 A constant electric current, thereby recording for 13 hours a difference in charging conductance when a high frequency is connected or disconnected. A straight line 47 obtained by a least-square method shows zero of high-frequency dependent conductance in 12 hours after the charge. This means that lead silicate which is a dipole has been completely reduced and charged, indicating clearly termination of the charge. Further, 3 A is multiplied by 12 hours to obtain 36 A hr charge. Discharge characteristics at 6.5 A constant electric current after charge for regeneration shown in FIG. 3 show 5.6 hours up to 10.5 V, and an actual storage quantity is about 36 A hr which is in good agreement. Thus, there is obtained effective information on termination of charge. Termination of complete charge in a rechargeable storage battery is clearly known from the fact that a charging current is kept unchanged when a peak frequency for driving inactive dielectric relaxation loss is connected or disconnected. Thus, there has been proposed an apparatus for accurately controlling invalid dark charge electricity to be charged.

A Curve 48 in FIG. 5 is such that a lead silicate battery SP27-12S is repeatedly subjected to sweeping and loading at a high frequency from 1 MHz to 90 MHz during 3 A constant electric current charge, thereby recording for 13 hours a high-frequency charging conductance which shows a dipole quantity. A straight line 49 obtained by a least-square method is such that the high frequency conductance is zero in 12 hour after the charge. This means that lead silicate which is a dipole has been completely reduced and charged, indicating clearly termination of the charge.

From the straight line obtained by the least square method, the number of both dielectric crystallization and non-crystallization dipoles which is a quantity of electrode crystalline and non-crystalline non-conductors proportional to a discharge quantity is proportional to conductance at a peak frequency of dielectric relaxation loss. Therefore, the discharge quantity is known and the discharge quantity at the present time is deducted from a rated storage quantity. It is, then, possible to propose an apparatus for outputting a remaining storage quantity which is a state-of-charge and a signal that indicates termination of complete charge, when both dielectric crystallization and non-crystallization dipoles are zero in conductance.

A Curve 50 in FIG. 6 is such that a lithium ion battery US18650 used in a discarded laptop computer is repeatedly subjected to sweeping and loading a high frequency from 1 MHz to 200 MHz during charge by a direct current constant at 0.2 A. A longitudinal axis shows a difference in charging conductance when a high frequency is connected or disconnected, with a unit of siemens. This is data obtained when the battery is substantially zero in remaining charge electricity. A horizontal axis indicates a high frequency applied cumulatively to direct-current voltage on charge.

Figure 7:
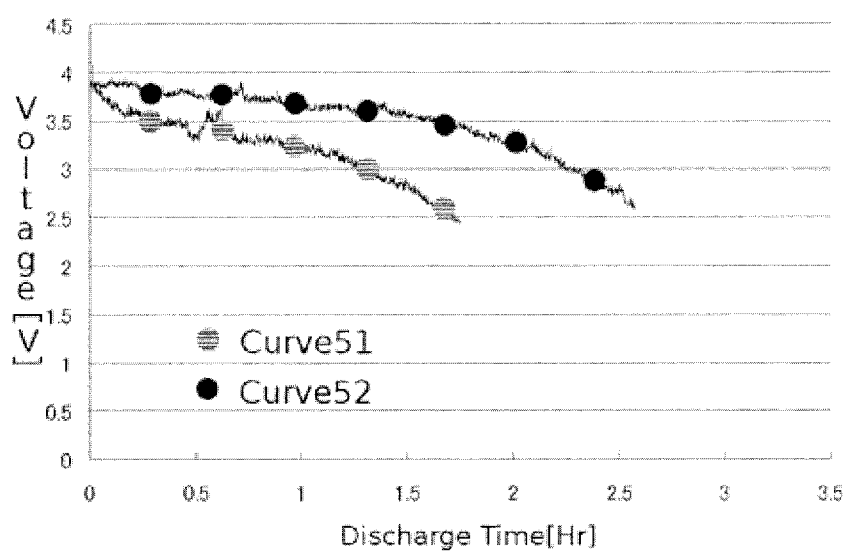
FIG. 7 is a drawing which shows discharge characteristics of the lithium ion battery

FIG. 7 shows discharge characteristics of a lithium ion battery US18650 at 0.5 A on regeneration thereof. A longitudinal axis shows discharge voltage and a horizontal axis shows discharge time. A Curve 51 shows discharge characteristics of the battery which is fully charged only by direct current at a constant voltage of 4.5 V. A longitudinal axis shows voltage of the battery and a horizontal axis shows elapsed time after discharge. A Curve 52 shows a curve of discharge characteristics obtained when the battery is fully charged for regeneration at a high frequency. The battery is regenerated so as to substantially satisfy 1.28 A Hr specified by the US18650.

The results of FIG. 6 and FIG. 7 show that behavior similar to that of a lead silicate battery is found only by shifting a dipole vibration frequency of the lithium ion battery to a high frequency. It is, therefore, possible to estimate when the battery is fully charged and measure a remaining storage quantity.

A Curve 53 in FIG. 8 shows voltage and high-frequency dependent characteristics on charge at a constant current of 0.1 A which are observed in one of 20 nickel nitrogen batteries of an AMC 10V-UE battery pack used in a portable vacuum cleaner which was discharged. A longitudinal axis shows a difference in voltage with or without loads at a high frequency on charge at a constant current. A horizontal axis shows a frequency. A decrease in charging voltage resulting from the high frequency is found at a band from 80 MHz to 140 MHz and internal impedance on charge is decreased, which shows effective regeneration of electrodes by charge. It is understood that an inactivating dipole of salt which adheres on a hydrogen absorbing electrode is separated by dielectric heating to activate the electrode.

Figure 9:
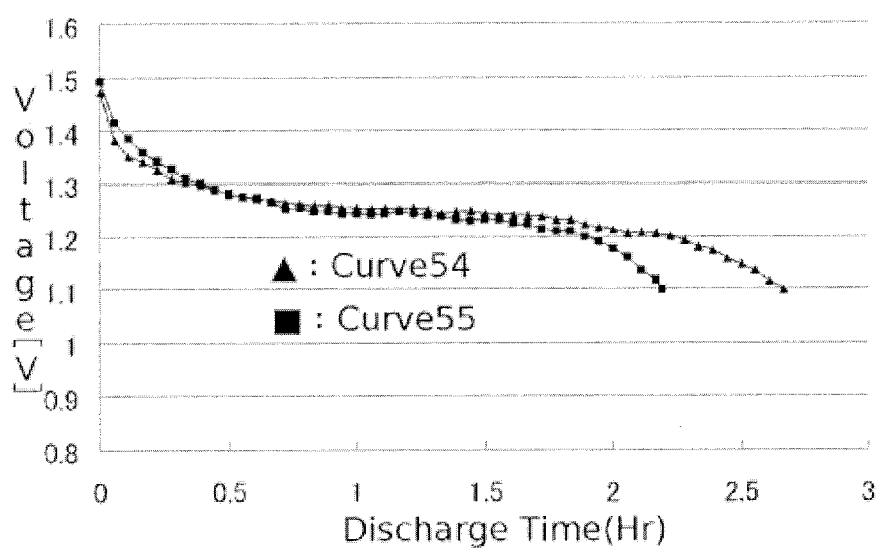
FIG. 9 is a drawing which shows discharge characteristics of the nickel hydrogen battery.

FIG. 9 shows discharge characteristics of a nickel hydrogen battery at 1 A. A Curve 55 shows discharge characteristics of the battery which is fully charged only by direct current constant-voltage of 1.5 V. A longitudinal axis shows a voltage of the battery, and a horizontal axis shows elapsed time of discharge. A Curve 54 shows discharge characteristics after charge at a constant current of 1 A at a high frequency as with the lithium ion battery. It is found that the battery has been restored up to a charging capacity of 2.9 A Hr as initially specified.

Lead acid batteries have been used extensively for starting engines of automobiles, marine vessels, etc., and also used as local storage stations of smart grids. They are also used in pulsation and rectification of wind turbine generators and solar batteries for utilizing natural energies. The present invention is capable of contributing to extension of cycle life of the storage batteries and made available accordingly.

DESCRIPTION OF REFERENCE NUMERALS

21: MPU (microprocessor) for controlling apparatus for regenerating storage battery
22: Charging voltage commanding D/A converter by MPU 21
23: Charging voltage power amplifier
24: High frequency cutoff coil
25: Storage battery to be regenerated
26: Storage battery terminal voltage measurement A/D converter
27: Dielectric loss high-frequency sweeping synthesizer
28: Dielectirc loss high-frequency electric power amplifier
29: Direct current cutoff condenser
30: Charging direct-current detector
31: Dielectric loss high-frequency electric current detector
32: Dielectric loss high-frequency electric current measurement A/D converter
33: Charging current measurement A/D converter
34: Charging current returning channel
41: High-frequency side peak of dielectric loss of lead silicate storage battery on charge by direct current at a constant voltage 42: Intermediate frequency-side peak of dielectric loss of lead silicate storage battery on charge by direct current at a constant voltage
43: Low frequency-side peak of dielectric loss of lead silicate storage battery which is not yet charged
44: High frequency-side peak of dielectric loss of lead silicate storage battery which is not yet charged
45: Intermediate frequency-side peak of dielectric loss of lead silicate storage battery which is not yet charged
46: Low frequency-side peak of dielectric loss of lead silicate storage battery which is not yet charged

What is claimed is:

1. An apparatus for electrochemically removing an electrode non-conductor inactivating layer on the basis of charge and discharge which is a cause for deterioration of storage capacity of a rechargeable battery, comprising:
    a charging voltage detector;
    a charging current detector;
    a charging current breaker;
    a high-frequency variable oscillator;
    a high-frequency constant-voltage output electric power amplifier; and
    a high-frequency electric current detector and a high-frequency electric current breaker; and
    wherein a high-frequency alternating current at a frequency of dielectric loss in association with heat-generating effects caused by dielectric relaxation loss is applied to positive and negative electrodes of the rechargeable storage battery;
    wherein individual peak frequencies of dielectric relaxation loss of rechargeable batteries in general are automatically searched by an increase in high-frequency dependent charging current, thereby selectively decomposing an insulation layer;
    wherein a frequency of the high-frequency alternating current is found at a high-frequency band of ion diffusion current of the rechargeable battery which is equal to or higher than a response speed;
    wherein the apparatus outputs a remaining storage quantity which is a state-of-charge and a signal that indicates termination of complete charge when both at least one of a number of dielectric crystallization and a number of non-crystallization dipoles are zero in conductance;
    wherein the number of dielectric crystallization and non-crystallization dipoles, which is a quantity of electrode crystallization and non-crystallization non-conductor substances proportional to a discharge quantity, is proportional to conductance at peak frequencies of relaxation loss of both said at least one of the dielectric crystallization and said at least one of the non-crystallization dipoles, so as to correspond to a discharge quantity;
    wherein the discharge quantity at the present time is deducted from a rated storage quantity; and
    wherein the apparatus performs a method for intermittently modulating a continuous high-frequency electric current, thereby effectively imparting a thermo-mechanical impact to said insulation layer.

2. An apparatus for removing said electrode non-conductor inactivating layer on the basis of charge and discharge according to claim 1, which accurately controls invalid dark charge electricity to be charged by identifying the termination of complete charge of the rechargeable storage battery from the charging current when the charging current is kept unchanged when a peak frequency for driving dielectric relaxation loss is connected or disconnected.

3. An apparatus for removing said electrode non-conductor inactivating layer on the basis of charge and discharge according to claim 1, wherein application of the high frequency alternating current and charge of the rechargeable storage battery are carried out alternately to regenerate and activate layer compositions of the rechargeable storage battery which have been thermally decomposed due to dielectric relaxation loss by using charging current.

* * * * *